(12) United States Patent
Matsuura (10) Patent No.: US 10,151,950 B2
(45) Date of Patent: Dec. 11, 2018

(54) LIGHT SOURCE DEVICE WITH COLOR CONVERSION MEMBER, SUPPORTING MEMBER AND LIGHT SUPPRESSING MEMBER

(71) Applicant: CANON KABUSHIKI KAISHA, Tokyo (JP)

(72) Inventor: Yasuhiro Matsuura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 15/394,926

(22) Filed: Dec. 30, 2016

(65) Prior Publication Data

US 2017/0192304 A1 Jul. 6, 2017

(30) Foreign Application Priority Data

Jan. 6, 2016 (JP) ................. 2016-001178

(51) Int. Cl.
*G02F 1/1335* (2006.01)
*F21V 8/00* (2006.01)
*G02F 1/1333* (2006.01)

(52) U.S. Cl.
CPC ........ *G02F 1/133611* (2013.01); *G02B 6/005* (2013.01); *G02B 6/009* (2013.01); *G02B 6/0031* (2013.01); *G02B 6/0088* (2013.01); *G02F 1/133512* (2013.01); *G02F 1/133603* (2013.01); *G02F 1/133606* (2013.01); *G02F 1/133608* (2013.01); *G02F 1/133609* (2013.01); *G02F 2001/133388* (2013.01); *G02F 2001/133614* (2013.01); *G02F 2202/36* (2013.01); *G02F 2203/055* (2013.01)

(58) Field of Classification Search
CPC ......... G02F 1/133611; G02F 1/133617; G02F 2001/133614; G02B 6/005
See application file for complete search history.

(56) References Cited

U.S. PATENT DOCUMENTS 9,401,116 B2 7/2016 Matsuura
9,423,554 B2 8/2016 Ohkawa et al.
(Continued)

FOREIGN PATENT DOCUMENTS

EP 2 650 721 A1 10/2013
EP 2 988 165 A1 2/2016
(Continued)

OTHER PUBLICATIONS

Search Report dated Mar. 31, 2017, in European Patent Application No. 16204216.2.

*Primary Examiner* — Robert J May
(74) *Attorney, Agent, or Firm* — Fitzpatrick, Cella, Harper & Scinto (57) ABSTRACT

A light source device of the present invention includes a light source that emits first light, a wavelength conversion member that converts the wavelength of the first light made incident on a surface of the wavelength conversion member on the side of the light source and emits second light different from the first light, and a supporting member that supports the wavelength conversion member at an end portion of a surface of the wavelength conversion member on the side of the light source. A light absorbing member is provided between a surface of the wavelength conversion member on the side of the light source and the supporting member.

20 Claims, 8 Drawing Sheets

(56) References Cited

U.S. PATENT DOCUMENTS

| | | | |
|---|---|---|---|
| 9,568,664 B2* | 2/2017 | Cho | G02B 6/0065 |
| 9,817,270 B2* | 11/2017 | Nagatani | G02F 1/133617 |
| 9,857,524 B2* | 1/2018 | Li | G02B 6/005 |
| 2007/0103939 A1* | 5/2007 | Huang | G02B 6/0078 |
| | | | 362/633 |
| 2015/0009454 A1 | 1/2015 | Nagatani et al. | |
| 2015/0160401 A1* | 6/2015 | Namekata | G02F 1/1336 |
| | | | 349/65 |
| 2015/0300576 A1 | 10/2015 | Matsuura | |
| 2016/0033106 A1 | 2/2016 | Matsuura | |
| 2016/0327723 A1 | 11/2016 | Ohkawa et al. | |
| 2018/0039006 A1* | 2/2018 | Gotou | G02B 6/005 |

FOREIGN PATENT DOCUMENTS

| | | |
|---|---|---|
| JP | 2011-171365 | 9/2011 |
| JP | 2012-022028 | 2/2012 |
| JP | 2013-218954 | 10/2013 |

\* cited by examiner

LIGHT SOURCE DEVICE WITH COLOR CONVERSION MEMBER, SUPPORTING MEMBER AND LIGHT SUPPRESSING MEMBER

BACKGROUND OF THE INVENTION

Field of the Invention

The present invention relates to a light source device.

Description of the Related Art

As a backlight device for a liquid crystal display apparatus, there has been proposed a light source device including B-LEDs and a wavelength conversion member including R fluorescent bodies and G fluorescent bodies. The B-LEDs are light emitting diodes (LEDs) that emit blue light. The R fluorescent bodies are fluorescent bodies excited by the blue light to emit red light. The G fluorescent bodies are fluorescent bodies excited by the blue light to emit green light. In such a light source device, the red light is emitted from the R fluorescent bodies and the green light is emitted from the G fluorescent bodies by the blue light from the B-LEDs. Combined light obtained by combining the blue light from the B-LEDs, the red light from the R fluorescent bodies, and the green light from the G fluorescent bodies is emitted from the light source device. If such a light source device is used, it is possible to obtain light in a wide color gamut as light emitted from the light source device.

In recent years, a quantum dot has been proposed as a fluorescent body (a wavelength conversion element) that can generate light having high purity by being excited. The quantum dot is a fluorescent body that reacts to ultraviolet light or blue light to emit light having a wavelength corresponding to a particle diameter of the quantum dot. If the quantum dot is used, it is possible to obtain red light and green light having half-value width of approximately 40 nm from blue light. Therefore, it is possible to obtain light in a wider gamut as light emitted from a light source device.

A light source device including the quantum dot is disclosed in, for example, Japanese Patent Application Laid-open No. 2012-022028. In a technique disclosed in Japanese Patent Application Laid-open No. 2012-022028, a sheet member (a quantum dot sheet) containing quantum dots are used as wavelength conversion members. Backlights including such a quantum dot sheet are also increasing.

Japanese Patent Application Laid-open No. 2013-218954 discloses a technique for suppressing color unevenness at the time when a quantum dot member is provided between a light source of an edge-type backlight and a light guide plate. Specifically, there is disclosed a light source device including an optical component having a light incident surface opposite a plurality of light sources and a color unevenness preventing structure that suppresses lights of the light sources from being directly made incident on the optical component.

Japanese Patent Application Laid-open No. 2011-171365 discloses a light source device in which a light blocking unit that blocks at least a part of light directed to a direction of an angle equal to or larger than an irradiation angle of a translucent member covering a light source and directed to a light incident surface is provided.

SUMMARY OF THE INVENTION

In order to obtain uniform white light in a plane in the backlight including the quantum dot sheet, wavelength conversion of light by the quantum dots needs to be uniformly performed in a plane of the backlight. However, when the sheet member such as the quantum dot sheet is used, since a structure for retaining the position of the sheet is necessary, it is difficult to obtain uniform light emission in the plane. A reason for this is explained below.

When the quantum dot sheet disclosed in Japanese Patent Application Laid-open No. 2012-022028 is used in a display, the quantum dot sheet is provided to cover an effective display region of a liquid crystal display panel together with a light diffusion plate, a condensing sheet, and the like. In that case, it is necessary to extend an end portion of a sheet member to the outer side of the effective display region of the liquid crystal panel and support the sheet member in the region. Light made incident on the region on the outer side of the effective display region is mainly light reflected once by the sheet member or the like used together with, for instance, the quantum dot sheet (hereinafter referred to as "secondary light") rather than light directly made incident from a light emitting diode (hereinafter referred to as "primary light"). The secondary light is not uniform. A region of the quantum dot sheet on which the secondary light is made incident easily causes color unevenness. Therefore, it is desirable in obtaining uniform light emission in the plane to reduce the influence of wavelength conversion of the secondary light at the end portion as much as possible.

Figure 7A:
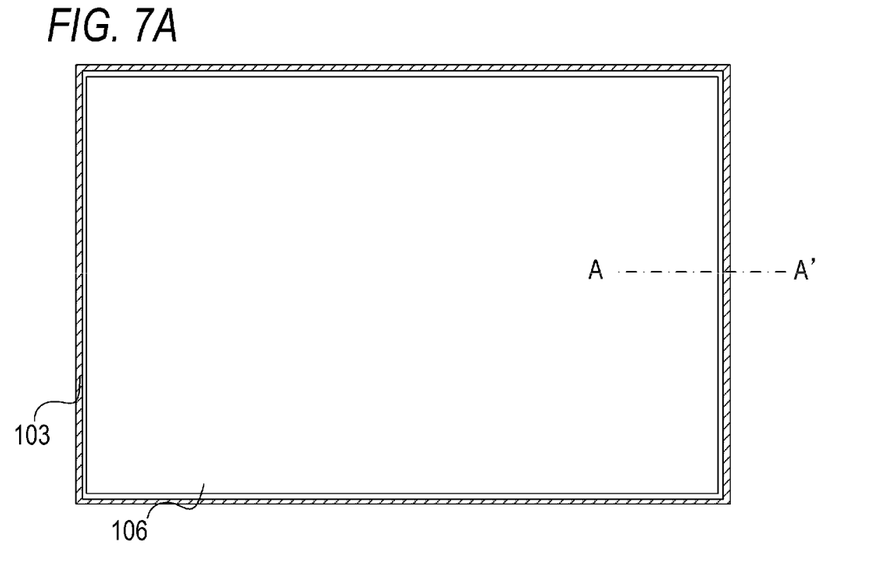
FIGS. 7A and 7B are diagrams showing a schematic configuration of a light source device according to the related art.
Figure 7B:
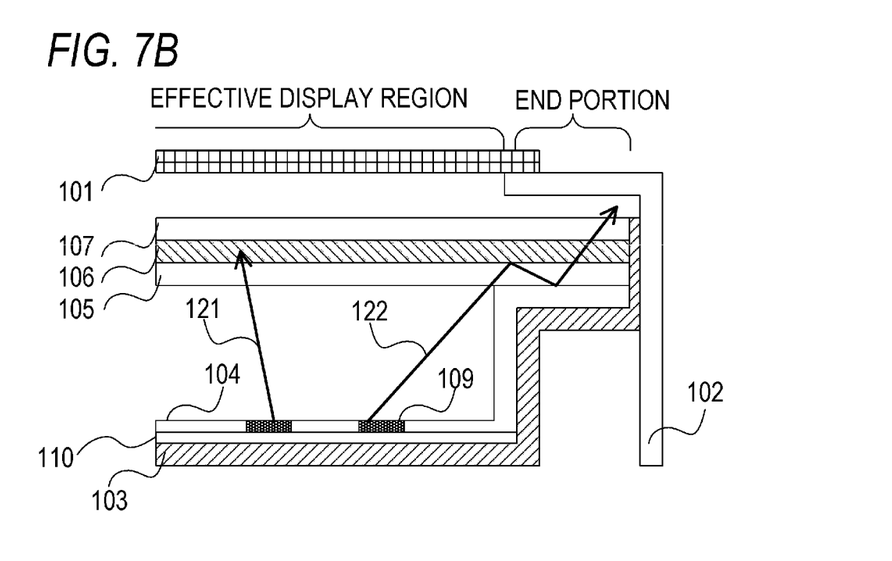

Details of this problem are shown in FIGS. 7A and 7B. FIG. 7A is a diagram (a top view) showing an example of the configuration of a liquid crystal display apparatus 100 according to the related art of this case. FIG. 7B is an A-A' sectional view of FIG. 7A.

In FIG. 7B, a wavelength conversion member 106 (as a representative example, a quantum dot sheet) is provided between a diffusing member 105 and a beam control member 107. The members are supported by a light source holding member 103 at end portions. In the wavelength conversion member 106 in an effective display region lower part of the liquid crystal panel 101, incidence of primary light 121 emitted from a light source 109 is mainly predominant. On the other hand, in a region at the end portion of the wavelength conversion member 106, incidence of secondary light 122 reflected on the interface between the diffusing member 105 and the wavelength conversion member 106 and the reflecting member 104 is predominant. As explained above, since the secondary light 122 is not uniform, the secondary light 122 made incident on the end portion of the wavelength conversion member 106 causes color unevenness.

The present invention provides a technique for enabling suppression of color unevenness in a light source device including a wavelength conversion member.

The present invention is a light source device comprising, a light source configured to emit light of a first color, a planar conversion member configured to transmit a part of the light of the first color and configured to convert another part of the light of the first color into light of a second color, a supporting member configured to support at least a part of an outer peripheral portion of the conversion member, and a suppressing member configured to suppress the emission of the light of the second color from at least the part of the outer peripheral portion of the conversion member supported by the supporting member to outside of the light source device.

The present invention enables suppression of color unevenness in a light source device including a wavelength conversion member.

Further features of the present invention will become apparent from the following description of exemplary embodiments with reference to the attached drawings.

DESCRIPTION OF THE EMBODIMENTS

First Embodiment

A light source device according to a first embodiment of the present invention is explained. The light source device according to this embodiment can be used, for example, as a light source device of an image display apparatus including a display unit that transmits light from the light source device to display an image on a screen. Specifically, the light source device according to this embodiment can be used as light source devices of image display apparatuses such as a liquid crystal display apparatus, an advertisement display apparatus, and a sign display apparatus. The light source device according to this embodiment can also be used as a light source device of an image display apparatus including a display element (e.g., a micro electro mechanical system (MEMS) shutter) different from a liquid crystal element of the liquid crystal display apparatus. The light source device according to this embodiment can also be used as light source devices of apparatuses (a room light, a street lamp, etc.) other than the image display apparatuses.

Figure 1:
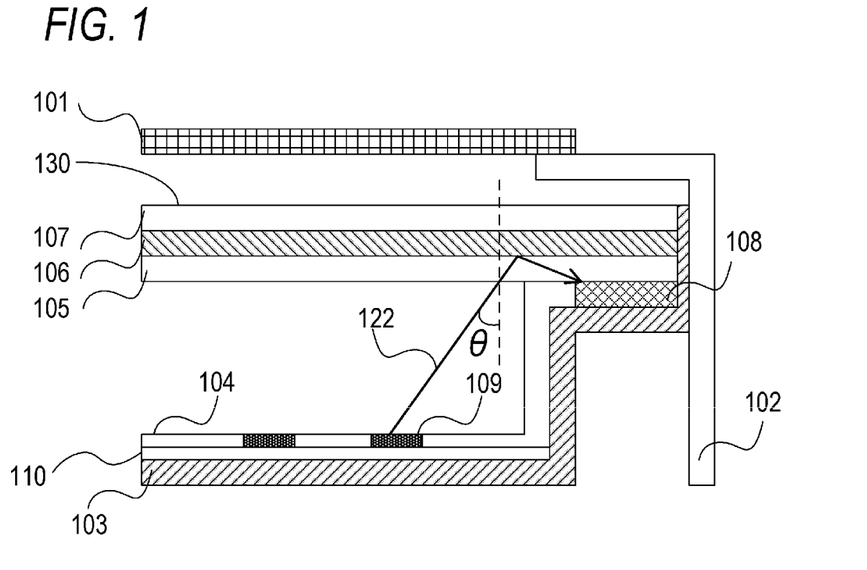
FIG. 1 is a sectional view of a light source device according to a first embodiment of the present invention.

FIG. 1 is a sectional view of a liquid crystal display apparatus 100 according to this embodiment.

The liquid crystal display apparatus 100 includes a liquid crystal panel 101, a liquid crystal panel holding member 102, and the light source device. The light source device includes a light source holding member 103, a reflecting member 104, a diffusing member 105, a wavelength conversion member 106, a beam control member 107, a light absorbing member 108, light sources 109, and a light source board 110.

The liquid crystal panel 101 is a display unit that transmit light from the light source device to display an image on a screen. The liquid crystal panel 101 includes a plurality of liquid crystal elements. The transmittances of the liquid crystal elements are controlled according to image data output from a not-shown image output device. Light from the light source device is transmitted through the liquid crystal panel 101 (the liquid crystal elements) at transmittance corresponding to the image data, whereby an image is displayed on the screen. In an example shown in FIG. 1, a surface of the liquid crystal panel 101 on the opposite side of the beam control member 107 is equivalent to the screen.

The liquid crystal panel holding member 102 holds the liquid crystal panel 101. In the example shown in FIG. 1, the interval between the beam control member 107 and the liquid crystal panel 101 is retained at a predetermined interval by the liquid crystal panel holding member 102.

The light source holding member 103 holds the light source 109. In the example shown in FIG. 1, the light source holding member 103 plays a role of a supporting member that supports the diffusing member 105, the wavelength conversion member 106, and the beam control member 107. Note that the light source holding member 103 may include a heat radiating structure that radiates heat of the light source 109 to the outside.

The reflecting member 104 is provided on the upper surface of the light source board 110 and reflects light emitted from the light source 109 to the side of the diffusing member 105. In the example shown in FIG. 1, the reflecting member 104 is a tabular member (a reflection plate). Note that the reflecting member 104 may be provided on a side surface of the light source holding member 103. Consequently, it is possible to improve reflection efficiency on the side surface. Note that the reflecting member 104 does not have to be the tabular member. For example, the reflecting member 104 may be a sheet member. That is, the light source holding member 103 plays a function of a housing that houses the light source 109 and the reflecting member 104.

The diffusing member 105 diffuses the light emitted from the light source 109. Consequently, it is possible to reduce luminance irregularity and color unevenness of light emitted from the light source device. As the diffusing member 105, for example, a diffusion plate, a diffusion sheet, a condensing sheet, a polarization sheet, and the like can be used. The diffusing member 105 may be configured by one member or may have structure in which a plurality of members are laid one on top of another. Note that the light source device does not have to include the diffusing member 105.

The light diffused by the diffusing member 105 is made incident on the wavelength conversion member 106. The wavelength conversion member 106 is excited by the light from the light source 109 to thereby generate light having a wavelength different from the wavelength of the light emitted by the light source. In this embodiment, the wavelength conversion member 106 includes R fluorescent bodies and G fluorescent bodies. The R fluorescent bodies are fluorescent bodies excited by blue light to thereby generate red light (light of a red color). The G fluorescent bodies are fluorescent bodies excited by the blue light to thereby generate green light (light of a green color). In this embodiment, excitation light that excites the fluorescent bodies is converted into light further on a long wavelength side than the excitation light by the fluorescent bodies. Therefore, the fluorescent bodies can also be called "light conversion elements" and "wavelength conversion elements". In this embodiment, the wavelength conversion member 106 includes quantum dots as the R fluorescent bodies and includes quantum dots as the G fluorescent bodies. In this embodiment, the numbers (ratios) of the R fluorescent bodies and the G fluorescent bodies are adjusted such that white light is obtained as the light emitted from the light source device. In the example shown in FIG. 1, the wavelength conversion member 106 is a planar sheet member (a quantum dot sheet). Note that, the following explanation, to simplify the explanation, reflection of light does not occur on the inside of the wavelength conversion member 106.

Note that the fluorescent bodies of the wavelength conversion member 106 do not have to be the quantum dots. The fluorescent bodies may be yellow fluorescent bodies such as YAG. The wavelength conversion member 106 does not have to be the sheet member. For example, the wavelength conversion member 106 may include a glass tube structure. The wavelength conversion member 106 only has to be a member that can convert the wavelength of incident light and generate light having another wavelength. The structure and the shape of the wavelength conversion member 106 are not particularly limited. Note that the light emitted from the light source device is not limited to the white light. For example, the light emitted from the light source device may be red light, green light, blue light, cyan light, magenta light, yellow light, ultraviolet light, and the like. The light generated by the excitation is not limited to the red light and the green light. For example, the light generated by the excitation may be blue light, cyan light, magenta light, yellow light, and the like.

The wavelength conversion member 106 is supported by the light source holding member 103 at an end portion of a surface on the side of the light source 109 explained below.

The beam control member 107 controls directivity and polarization of the light emitted from the wavelength conversion member 106. Consequently, it is possible to control the luminance and the angular field of view of the light emitted from the light source device. As the beam control member 107, for example, a condensing sheet and a polarization sheet can be used. The beam control member 107 may be configured by one member or may have structure in which a plurality of members are laid one on top of another. The light source device according to this embodiment emits light from a light emitting surface. In the example shown in FIG. 1, a light emitting surface 130 of the light source device is a surface of the beam control member 107 on the side of the liquid crystal panel 101. Note that the light source device does not have to include the beam control member 107.

The light absorbing member 108 is provided between the light source holding member 103 and the wavelength conversion member 106. In the case of this embodiment, the diffusing member 105 is further provided between the light absorbing member 108 and the wavelength conversion member 106. The light absorbing member 108 is a member that absorbs light from the light source 109, the diffusing member 105, the wavelength conversion member 106, the beam control member 107, the liquid crystal panel 101, and the like. Consequently, it is possible to absorb unnecessary light that causes color unevenness. That is, the light source holding member 103 plays a function of a housing that houses the light source 109 and the reflecting member 104. As the light absorbing member 108, a light absorbing sheet, a non-reflection sheet, or the like can be used. The light absorbing member 108 may be a member that absorbs only the blue light for exciting the wavelength conversion member 106. It is also possible to configure, according to degrees of color unevenness and luminance irregularity, the light absorbing member 108 from a reflecting member having reflectance lower than the reflectance of the reflecting member 104. In this case, the light absorbing member 108 only has to be a member having reflectance lower than the reflectance of the reflecting member 104 at least in the blue light.

In the light source 109, in this embodiment, a light emitting diode (LED) that emits blue light (light of a blue color) is used as a light emitting member. In this embodiment, the light emitted from the light source 109 is used as excitation light for the wavelength conversion member. Note that the light emitting element included in the light source 109 is not limited to the LED. For example, as the light emitting element, a laser element, an organic EL element, a cathode beam tube element, a plasma element, and the like may be used. Note that the light emitted from the light source 109 is not limited to the blue light. For example, the light emitted from the light source 109 may be ultraviolet light and the like. One light source 109 may include one light emitting element or may include a plurality of light emitting elements.

Figure 2A:
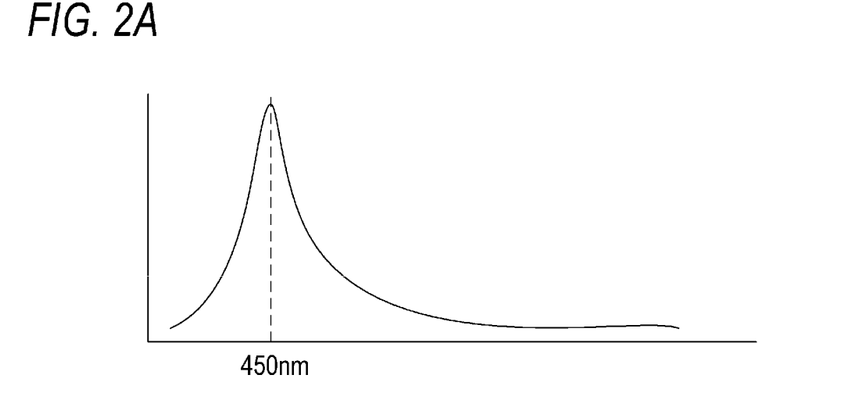
FIGS. 2A and 2B are diagrams showing characteristics of a light source according to the first embodiment of the present invention.

A specific example of action and effects of this embodiment is explained. As explained above, the blue light is emitted from the light source 109. Color light emitted from the light source 109 is, for example, light having a wavelength of a peak of a spectrum shorter than that wavelength of second and third color lights generated by the wavelength conversion member 106. The spectrum of the blue light emitted from the light source 109 has a peak (a maximum value), for example, in a wavelength range of 400 nm or more and 480 nm or less. An example of the spectrum (a spectral characteristic) of the blue light emitted from the light source 109 is shown in FIG. 2A. The horizontal axis of FIG. 2A indicates a wavelength and the vertical axis indicates intensity. In this embodiment, the light source 109 is disposed on the upper surface of the light source board 110. The number of disposed light sources 109 and an arrangement interval of the light sources 109 are determined taking into account a color of light emitted from the light source device, the luminance of the light emitted from the light source device, irregularity (luminance irregularity and color unevenness) of the light emitted from the light source device, and the like.

Figure 2B:
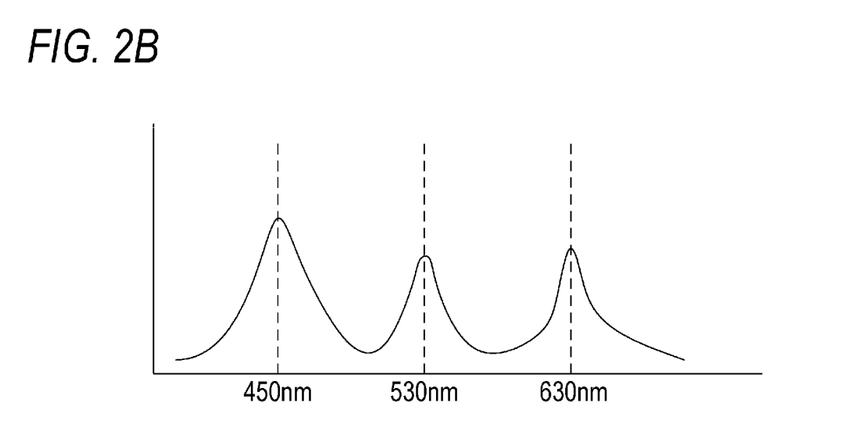

The wavelength conversion member 106 converts a part of the blue light emitted from the light source 109 into green light and red light and emits the blue light, the red light, and the green light. The spectrum of the red light generated by the wavelength conversion member 106 has a peak, for example, in a wavelength range of 580 nm or more and 700 nm or less. The spectrum of the green light generated by the wavelength conversion member 106 has a peak, for example, in a wavelength range of 500 nm or more and 550 nm or less. An example of the spectrum of combined light emitted from the wavelength conversion member 106 is shown in FIG. 2B. It is seen from FIG. 2B that the spectrum of the combined light emitted from the wavelength conversion member 106 has three peaks, that is, the peak of the spectrum of the blue light, the peak of the spectrum of the red light, and the peak of the spectrum of the green light. The combined light having the spectra shown in FIG. 2B is, for example, white light.

Note that, when the light emitted from the light source 109 is ultraviolet light, it is possible to obtain combined light of the blue light, the green light, and the red light wavelength-converted by the wavelength conversion member 106 using the ultraviolet light as excitation light. The combined light is, for example, white light, although the combined light changes according to the light source and the wavelength conversion member 106.

As light made incident on the end portion of the wavelength conversion member 106, the secondary light 122 is predominant. For example, when a quantum dot sheet is used in the wavelength conversion member 106, a light amount of the secondary light 122 is not uniform. Therefore, an amount of light radiated on quantum dots locally fluctuates at the end portion of the wavelength conversion member 106. Color irregularity occurs in emitted light.

In this embodiment, as a method of solving the problem, as shown in FIG. 1, the light absorbing member 108 is provided between the surface of the wavelength conversion member 106 on the light source 109 side and the light source holding member 103. Consequently, the secondary light 122 is absorbed by the light absorbing member 108, the incidence of the secondary light 122 on the end portion of the wavelength conversion member 106 is suppressed, and occurrence of color unevenness is also suppressed. That is, the light absorbing member 108 can be said to suppress red and green lights from being emitted from the end portion of the wavelength conversion member 106 to the outside of the light source device, by suppressing blue light from being made incident on the end portion of the wavelength conversion member 106.

As explained above, according to this embodiment, it is possible to suppress color unevenness and luminance irregularity at the end portion of the light source with a simple configuration in which the light absorbing member 108 is provided between the surface of the wavelength conversion member 106 on the light source 109 side and the light source holding member 103.

Second Embodiment

A light source device according to a second embodiment of the present invention is explained below. In this embodiment, a configuration is explained in which unevenness is provided at an end portion of a light source holding member 103 in order to retain positions of a wavelength conversion member and the like in a plane of a sheet member.

Figure 3A:
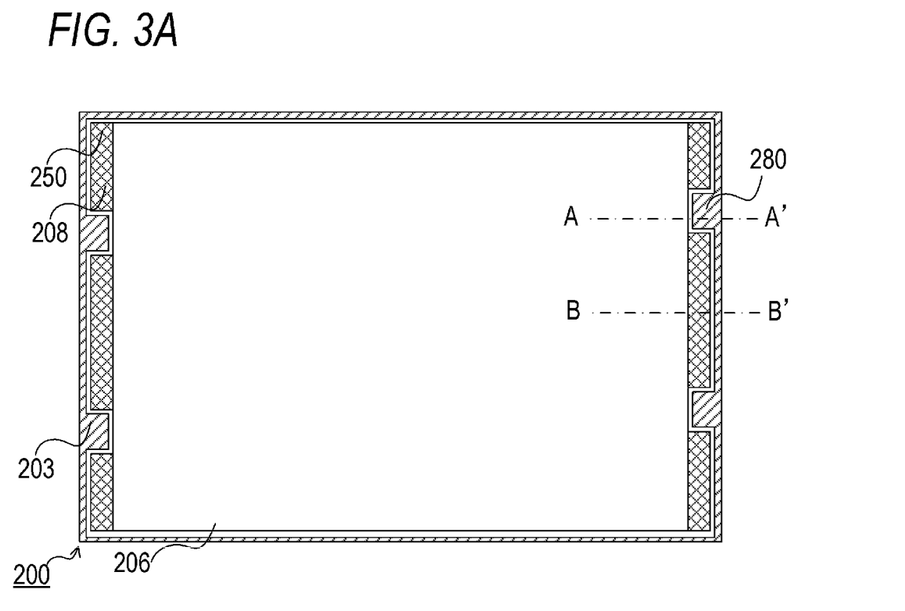
FIGS. 3A and 3B are diagrams showing a schematic configuration of a light source device according to a second embodiment of the present invention.
Figure 3B:
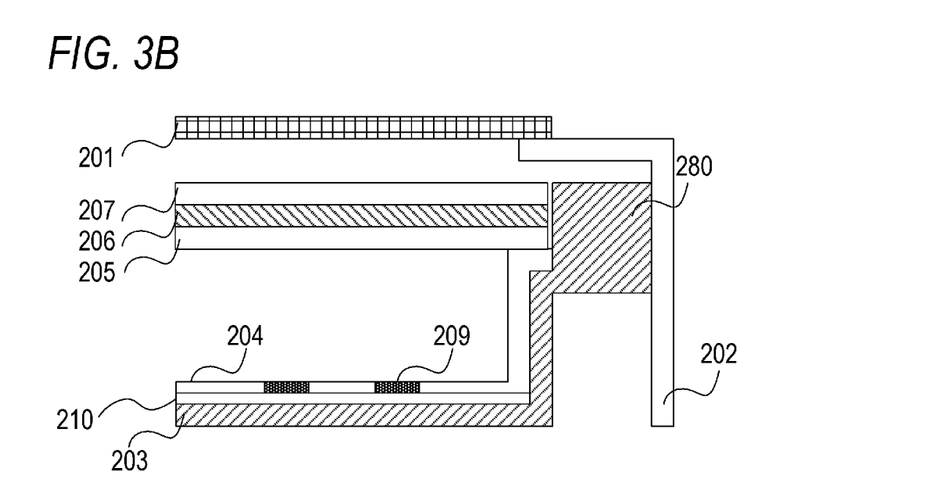

FIG. 3A is a diagram (a top view) showing an example of the configuration of a liquid crystal display apparatus 200 according to this embodiment. FIG. 3B is an A-A' sectional view of FIG. 3A. A B-B' cross section of FIG. 3A is the same as FIG. 1.

The liquid crystal display apparatus 200 includes a liquid crystal panel 201, a liquid crystal panel holding member 202, and the light source device. The light source device includes a light source holding member 203, a reflecting member 204, a diffusing member 205, a wavelength conversion member 206, a beam control member 207, a light absorbing member 208, light sources 209, a light source board 210, and a sheet fixing member 211.

The liquid crystal panel 201 is a member same as the liquid crystal panel 101 in the first embodiment (FIG. 1).

The liquid crystal panel holding member 202 is a member same as the liquid crystal panel holding member 102 in the first embodiment.

The light source holding member 203 is made of a material same as the light source holding member 103 in the first embodiment. Note that, as in the first embodiment, the light source holding member 203 plays a role of a supporting member that supports the diffusing member 205, a wavelength conversion member 206, and the beam control member 207.

The reflecting member 204 is made of a material same as the reflecting member 104 in the first embodiment.

The diffusing member 205 is made of a material same as the diffusing member 105 in the first embodiment.

The wavelength conversion member 206 is made of a material same as the wavelength conversion member 106 in the first embodiment.

The beam control member 207 is made of a material same as the beam control member 107 in the first embodiment.

The light absorbing member 208 is made of a material same as the light absorbing member 108 in the first embodiment.

The light source 209 is a member same as the light source 109 in the first embodiment.

The light source board 210 is a member same as the light source board 110 in the first embodiment.

In this embodiment, as shown in FIG. 3A, the light source holding member 203 has a shape of unevenness at an end portion. Sheet members such as the diffusing member 205, the wavelength conversion member 206, and the beam control member 207 and the reflecting member 204 also have shapes of unevenness at end portions. The sheet members are provided such that concave portions fit with a convex portion 280 of the light source holding member 203. With this structure, the sheet members are aligned and provided. Positional deviation in a plane is prevented.

In a cross section of FIG. 3A, that is, the sectional view shown in FIG. 1, the light source holding member 203 supports the wavelength conversion member 206 at an end portion of a surface of the wavelength conversion member 206 on the side of the light source 209. Note that, in this embodiment, the diffusing member 205 and the beam control member 207 are also supported by the light source holding member 203 together with the wavelength conversion member 206.

As in the first embodiment, in this embodiment, the secondary light 122 made incident on the end portion of the wavelength conversion member is a problem. In particular, in this embodiment, a difference in structure of the end portion in the A-A' cross section and the B-B' cross section due to the unevenness of the end portion of the light source holding member 203 is a problem. Such a difference in the structure causes a difference in reflection of light at the end portion. More specifically, a difference occurs in the number of times light passes through the wavelength conversion member 206. This causes color unevenness. In order to solve the problem, it is conceivable to set a quantum dot sheet area sufficiently wide with respect to an effective display region of the liquid crystal panel 201 to eliminate the influence of the uneven portion. However, it is likely that a frame of a product increases in size and marketability is spoiled.

In order to solve the problem, in this embodiment, as shown in FIG. 3A, the sheet member such as the wavelength conversion member 206 includes a convex portion at the end portion (in the following explanation, referred to as convex piece 250 in order to distinguish the convex portion from the convex portion of the light source holding member). Further, a positional relation in a cross section direction is explained. In the region of the convex piece 250, as shown in FIG. 1, the light absorbing member 208 is provided between the surface of the wavelength conversion member 206 on the side of the light source 209 and the light source holding member 203. Note that the shape and the size of the light absorbing member 208 do not have to be same as the shape and the size of the convex piece 250. In a region other than the convex piece 250, as it is seen from FIG. 3B, the problem of the secondary light less easily occurs. Therefore, a light absorbing member does not have to be provided.

By adopting such structure, wavelength conversion of the secondary light 122 in the wavelength conversion member 206 in the region of the convex piece 250 is suppressed. A reflection structure at the end portion becomes uniform. Consequently, color unevenness of the light emitted from the wavelength conversion member 206 is suppressed.

Since the light source holding member 203 includes the unevenness at the end portion, the unevenness can be aligned with the uneven portion of the sheet member such as the wavelength conversion member 206. Consequently, it is possible to prevent positional deviation in the plane.

Third Embodiment

In this embodiment, the configuration of a light source device in the case in which a fixing member is used to fix the diffusing member 105 and the like to the light source holding member 103 is explained.

Figure 4A:
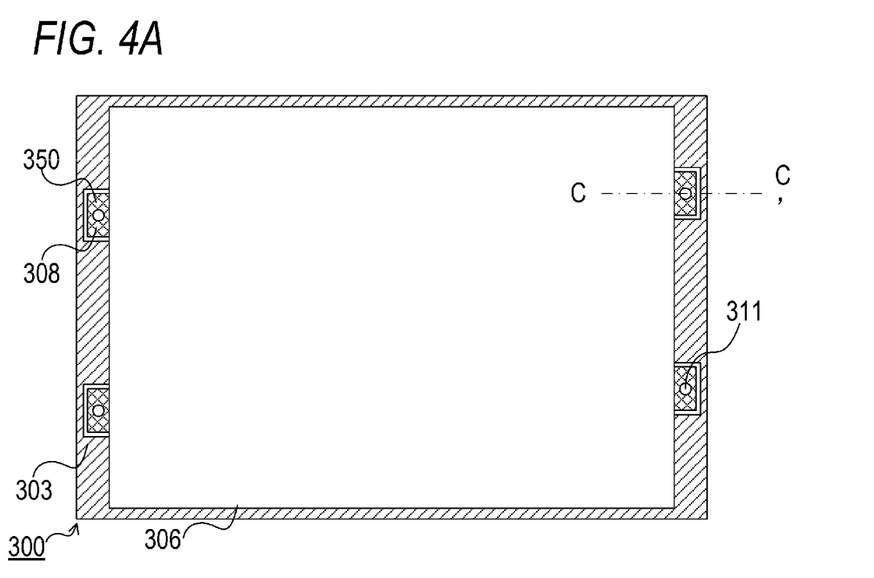
FIGS. 4A and 4B are diagrams showing a schematic configuration of a light source device according to a third embodiment of the present invention.
Figure 4B:
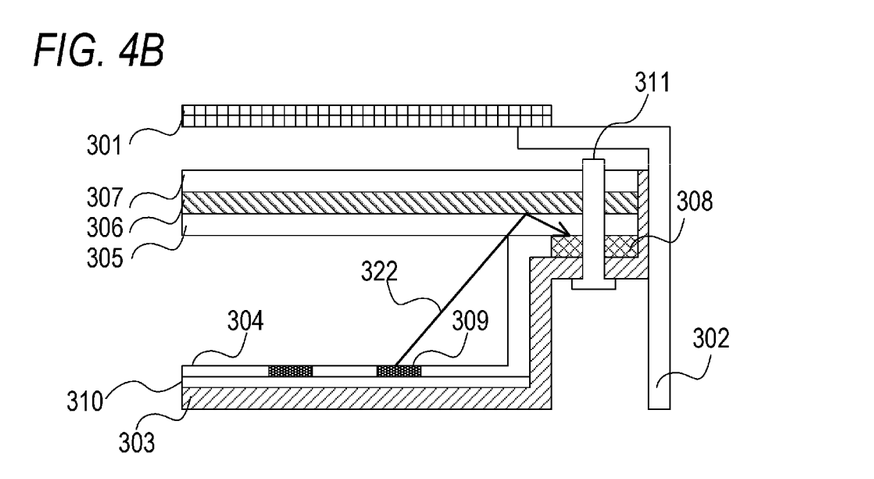

FIG. 4A is a diagram (a top view) showing an example of the configuration of a liquid crystal display apparatus 300 according to this embodiment. FIG. 4B is a C-C' sectional view of FIG. 4A.

The liquid crystal display apparatus 300 includes a liquid crystal panel 301, a liquid crystal panel holding member 302, and the light source device. The light source device includes a light source holding member 303, a reflecting member 304, a diffusing member 305, a wavelength conversion member 306, a beam control member 307, a light absorbing member 308, a light source 309, a light source board 310, and a sheet fixing member 311.

The liquid crystal panel 301 is a member same as the liquid crystal panel 101 in the first embodiment (FIG. 1).

The liquid crystal panel holding member 302 is a member same as the liquid crystal panel holding member 102 in the first embodiment.

The light source holding member 303 is made of a material same as the light source holding member 103 in the first embodiment. Note that, as in the first embodiment, the light source holding member 303 plays a role of a supporting member that supports the diffusing member 305, the wavelength conversion member 306, and the beam control member 307.

The reflecting member 304 is made of a material same as the reflecting member 104 in the first embodiment.

The diffusing member 305 is made of a material same as the diffusing member 105 in the first embodiment.

The wavelength conversion member 306 is made of a material same as the wavelength conversion member 106 in the first embodiment.

The beam control member 307 is made of a material same as the beam control member 107 in the first embodiment.

The light absorbing member 308 is made of a material same as the light absorbing member 108 in the first embodiment.

The light source 309 is made of a material same as the light source 109 in the first embodiment.

The light source board 310 is a member same as the light source board 110 in the first embodiment.

The sheet fixing member 311 is a member for fixing the diffusing member 305, the wavelength conversion member 306, the beam control member 307, and the like to the light source holding member 303. The sheet fixing member 311 may be a pin structure or may be a rivet structure. The sheet fixing member 311 can take any structure for fixing the sheet members. The material of the sheet fixing member 311 may be metal or may be resin such as plastic.

As shown in FIGS. 4A and 4B, in this embodiment, as in the second embodiment, in the region of a convex piece 350, the light absorbing member 308 is provided between a surface of the wavelength conversion member 306 on the side of the light source 309 and the light source holding member 303. Note that the area and the shape of the light absorbing member 308 do not have to be the same as the area and the shape of the convex piece 350.

In this embodiment, as shown in FIGS. 4A and 4B, in the convex piece 350, the sheet members such as the diffusing member 305, the wavelength conversion member 306, and the beam control member 307 are fixed to the light source holding member 303 by the sheet fixing member 311.

In the configuration in this embodiment as well, wavelength conversion of secondary light 322 in the wavelength conversion member 306 in the region of the convex piece 350 is suppressed. Consequently, color unevenness of light emitted from the wavelength conversion member 306 is suppressed.

Further, by using the sheet fixing member 311, the sheet members such as the wavelength conversion member 306 are more firmly fixed to the light source holding member 303 compared with the case of the first embodiment. As a result, even when the liquid crystal display apparatus 300 rotates, for example, rotates 90 degrees from a state shown in FIG. 4A, the sheet members such as the wavelength conversion member 306 are fixed in desired positions. A role of holding the sheet members is performed by the sheet fixing member 311. Therefore, the area of the convex piece can be reduced compared with the area in the second embodiment. This leads to a reduction in manufacturing cost.

Fourth Embodiment

A light source device according to a fourth embodiment of the present invention is explained below. In this embodiment, it is assumed that light sources are regularly disposed in a plane, for example, disposed in zigzag or disposed in a triangular shape. Incidentally, in general, in order to surely cover an effective display region of a liquid crystal panel, sheet members such as a wavelength conversion member, a diffusing member, and a beam control member have areas equal to or larger than the effective display region. In such a configuration, a difference occurs in a light-reaching region on upper and lower sides and left and right sides. In this embodiment, a method of suppressing color unevenness taking into account the difference is explained.

Figure 5:
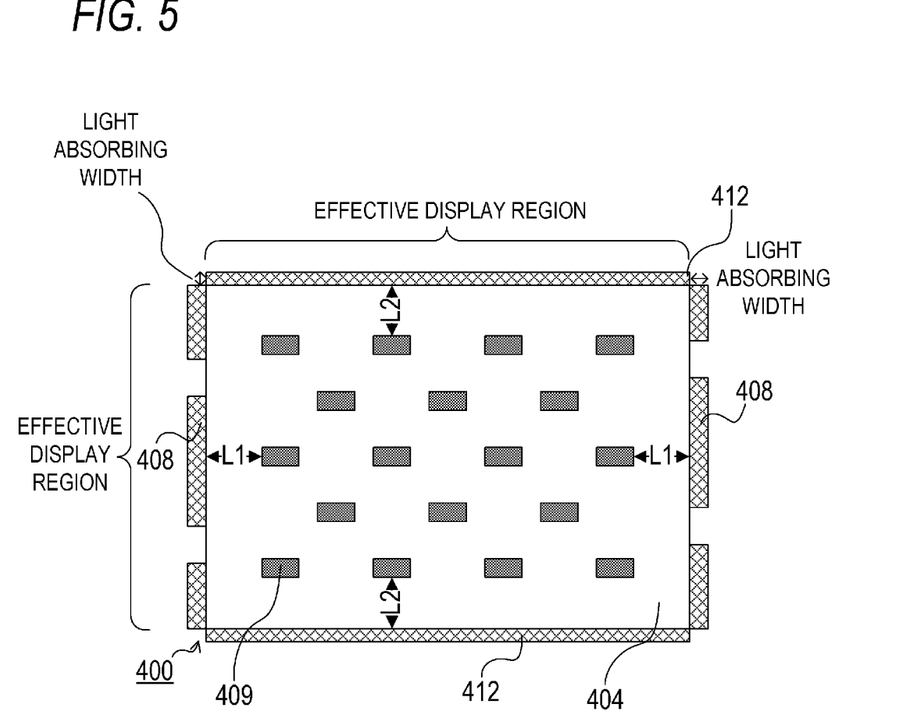
FIG. 5 is a diagram showing a schematic configuration of a light source device according to a fourth embodiment of the present invention.

FIG. 5 is a diagram (a top view of a light source side viewed from a diffusing member) showing an example of the configuration of a light source device 400 according to this embodiment.

The light source device includes a reflecting member 404, a diffusing member (not shown in the figure), a wavelength conversion member (not shown in the figure), a beam control member (not shown in the figure), first light absorbing members 408, light sources 409, a light source board (not shown in the figure), and second light absorbing members 412.

The reflecting member 404 is made of a material same as the reflecting member 104 in the first embodiment.

The first light absorbing members 408 are materials same as the light absorbing member 108 in the first embodiment. In this embodiment, the first light absorbing members 408 are light absorbing members provided on the left and right sides on the outer side of the effective display region of a liquid crystal display panel.

The light sources 409 are members same as the light sources 109 in the first embodiment.

The second light absorbing members 412 are materials same as the light absorbing member 108 in the first embodiment. In this embodiment, the second light absorbing members 412 are light absorbing members provided on the upper and lower sides on the outer side of the effective display region of the liquid crystal display panel.

In this embodiment, the distance between the first light absorbing members 408 and the light sources 409 are represented as L1. The distance between the second light absorbing members 412 and the light sources 409 is represented as L2.

Further, a relation between L1 and L2 is represented as L1>L2.

In the fourth embodiment, the length of the second light absorbing members 412 (hereinafter referred to as "light absorbing width") in a direction parallel to the wavelength conversion member, which is a direction away from the light sources, is changed according to relationship between L1 and L2.

Specifically, the size of the first light absorbing members 408 is set the same as a contact area of the wavelength conversion member 406 and the light source holding member and then the light absorbing width of the second light absorbing members 412 is set to be smaller than the light absorbing width of the first light absorbing members 408. A reason for adopting such structure is explained. First, by setting the area of the first light absorbing members 408 the same as the contact area of the wavelength conversion member 406 and the light source holding member, wavelength conversion at the end portion of the wavelength conversion member 406 on the left and right sides is suppressed. On the other hand, when the sizes of L1 and L2 are different, the light absorbing width of the second light absorbing members may be reduced according to the relation between L1 and L2.

In the wavelength conversion member 406 on the outer side of the effective display region of the liquid crystal panel, the light-reaching region changes according to the distance to the light sources 409. To explain this, an angle of light made incident on the end portion is considered. As shown in FIG. 1, an incident angle of incident light (in this case, the secondary light 122) is defined as an angle from a line perpendicular to an incident surface (in this case, the wavelength conversion member 106). When the distance between the end portion of the sheet member such as the wavelength conversion member 406 and the light sources 409 is large, the incident angle of the incident light on the end portion increases. The incident light reaches farther in the direction away from the light sources 409. Conversely, when the distance between the end portion of the sheet member such as the wavelength conversion member 406 and the light source 409 is small, the incident angle of the incident light on the end portion decreases and the reaching distance of the incident light further decreases. Therefore, when the distance to the light sources is different at the end portion on the upper and lower sides and the end portion on the left and right sides as in this embodiment, the reaching distance of the incident light is different at the end portions. A difference occurs in a region that causes color unevenness. Therefore, in this embodiment, the light absorbing width of the second light absorbing members 412 is changed according to the distances L1 and L2 such that wavelength conversion at the end portions on the upper and lower sides and the left and right sides is uniformly performed.

Specifically, in the case of this embodiment, since L1 and L2 are in a relation of L1>L2, the incident light on the upper and lower sides has a smaller incident angle than the incident light on the left and right sides. Therefore, light is less easily propagated to the end portions on the upper and lower sides of the wavelength conversion member than the end portions on the left and right sides. Therefore, it is possible to set the second light absorbing members 412 provided on the upper and lower sides to be smaller than the light absorbing width of the first light absorbing members 408.

As explained above, according to this embodiment, when the light sources 409 are regularly disposed in the plane and the distance between the light sources 409 and the end portion of the wavelength conversion member is different on the upper and lower sides and the left and right sides, wavelength conversion at the end portion is suppressed. Consequently, wavelength conversion in the sides is uniformly performed. It is possible to suppress color unevenness and luminance unevenness of the light source device. In this embodiment, it is possible to reduce the area of the second light absorbing members 412 by reducing the light absorbing width. Therefore, it is possible to reduce manufacturing cost of the light source device 400.

Fifth Embodiment

A light source device according to a fifth embodiment of the present invention is explained below. In this embodiment, structure in which a light source is disposed on a side surface of a direct-type light guide plate is explained. That is, in this embodiment, the present invention applied in a so-called edge light-type backlight is explained.

Figure 6:
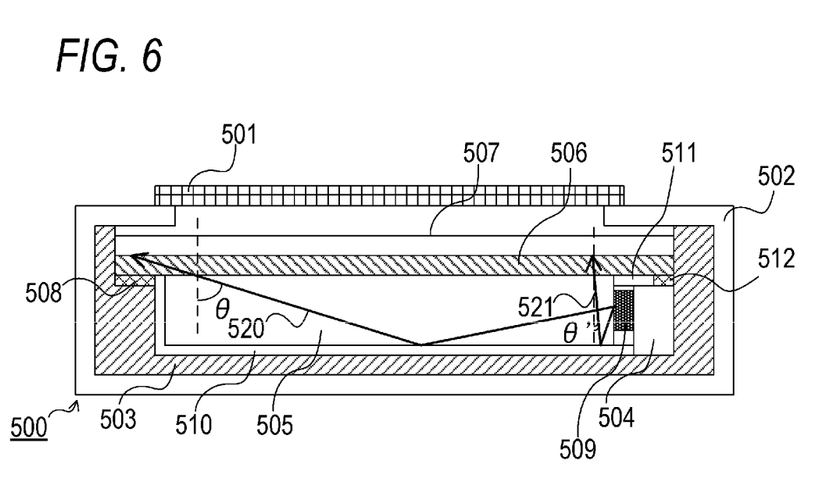
FIG. 6 is a sectional view of a light source device according to a fifth embodiment of the present invention.

FIG. 6 is a diagram (a sectional view) showing an example of the configuration of a liquid crystal display apparatus 500 according to this embodiment. The liquid crystal display apparatus 500 includes a liquid crystal panel 501, a liquid crystal panel holding member 502, and the light source device. The light source device includes a light source holding member 503, a reflecting member 504 a light guide member 505, a wavelength conversion member 506, a beam control member 507, a first light absorbing member 508, a light source 509, a light source board 510, a light blocking member 511, and a second light absorbing member 512.

The liquid crystal panel 501 is a member same as the liquid crystal panel 101 in the first embodiment (FIG. 1).

The liquid crystal panel holding member 502 is made of a material same as the liquid crystal panel holding member 102 in the first embodiment.

The light source holding member 503 is made of a material same as the light source holding member 103 in the first embodiment. The light source holding member 503 plays a role of a supporting member that supports the wavelength conversion member 506 at an end portion of a surface of the wavelength conversion member 506 on the side of the light source 509.

The reflecting member 504 is a member same as the reflecting member 104 in the first embodiment. The reflecting member 504 is provided to reflect light emitted from the light source 509 to the light guide member 505 explained below. In this embodiment, the reflecting member 504 plays a role of a supporting member that supports the wavelength conversion member 506 at the end portion of the surface of the wavelength conversion member 506 on the side of the light source 509.

The light guide member 505 includes an incident surface and an emission surface. The incident surface is an incident surface on which the light emitted from the light source 509 is made incident. The emission surface is a surface from which the light made incident on the incident surface is emitted. In the example shown in FIG. 6, the incident surface is a side surface on which the light source 509 is present among the side surfaces of the light guide member 505. The emission surface of the light guide member 505 is a surface on the wavelength conversion member 506 side. In the example shown in FIG. 6, a tabular member (a light guide plate) is used as the light guide member 505. Note that the light guide member 505 does not have to be the tabular member.

The wavelength conversion member 506 is made of a material same as the wavelength conversion member 106 in the first embodiment.

The beam control member 507 is made of a material same as the beam control member 107 in the first embodiment.

The first light absorbing member 508 is made of a material same as the light absorbing member 108 in the first embodiment. The first light absorbing member 508 is provided on a wall surface side of the light source holding member 503 farther from the light source 509.

The light source 509 is made of a material same as the light source 109 in the first embodiment.

The light source board 510 is made of a material same as the light source board 110 in the first embodiment.

The light blocking member 511 is a member for preventing the light emitted from the light source 509 from being directly radiated in the direction of the liquid crystal panel 501 not via the light guide member 505. Note that the light blocking member 511 may be a reflecting member from the viewpoint of luminance irregularity and color unevenness performance.

The second light absorbing member 512 is a member same as the light absorbing member 108 in the first embodiment. The second light absorbing member 512 is provided on a wall surface side of the light source holding member 503 closer to the light source 509.

In this embodiment, the first light absorbing member 508 is provided between the surface on the side of the wavelength conversion member 506 and the light source holding member 503. The second light absorbing member 512 is provided between the surface on the side of the wavelength conversion member 506 and the reflecting member 504. The size of the first light absorbing member 508 is set the same as, for example, a contact area of the wavelength conversion member 506 and the light source holding member 503. The size of the second light absorbing member 512 is set smaller than the size of the first light absorbing member 508 or is deleted.

A reason for adopting such structure is explained. In FIG. 6, an incident angle of incident light 520 on a region of the wavelength conversion member 506 on the light source 509 side present at an end portion far from the light source 509 is represented as θ. On the other hand, an incident angle of incident light 521 on a region of the wavelength conversion member 506 on the light source 509 side present at an end portion close to the light source 509 is represented as θ'. θ is larger than θ'. A reaching distance of the incident light 520 is also larger. Therefore, it is necessary to secure light absorbing width of the first light absorbing member 508 sufficiently large according to the incident angle and the distance. On the other hand, a reaching distance of the incident light 521 is small compared with the reaching distance of the incident light 520. Light absorbing width of the second light absorbing member 512 can be set smaller than the light absorbing width of the first light absorbing member. Alternatively, in structure for preventing propagation of light with the light blocking member 511, it is unnecessary to provide the second light absorbing member 512.

By adopting such structure, it is possible to suppress wavelength conversion according to the light reaching distances at the end portion close to the light source 509 and the end portion far from the light source 509. As a result, the wavelength conversion is equalized in the plane. A color of the light emitted from the wavelength conversion member 506 is also equalized.

As explained above, according to this embodiment, with the configuration for changing the light absorbing widths of the first light absorbing member 508 provided at the end portion far from the light source 509 and the second light absorbing member 512 provided at the end portion close to the light source 509, it is possible to suppress color unevenness and luminance irregularity of the light source device. In this embodiment, since the area of the second light absorbing member 512 can be reduced, it is possible to reduce manufacturing cost of the light source device. Note that, although not shown in the figure, in the configuration in this embodiment, as in the second and third embodiments, the light source device may include a holding structure for holding the sheet members at the end portion.

Sixth Embodiment

Figure 8:
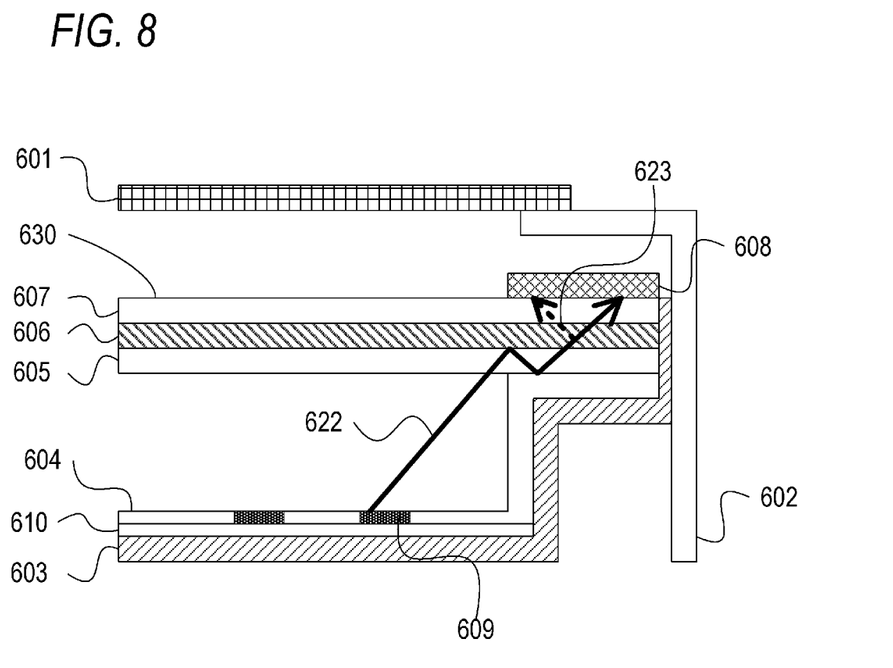
FIG. 8 is a sectional view of a light source device according to a sixth embodiment of the present invention.

A sixth embodiment of the present invention is explained with reference to FIG. 8. FIG. 8 is a sectional view of a liquid crystal display apparatus 600 according to the sixth embodiment. The liquid crystal display apparatus 600 includes a liquid crystal panel 601, a liquid crystal panel holding member 602, and a light source device. The light source device includes a light source holding member 603, a reflecting member 604, a diffusing member 605, a wavelength conversion member 606, a beam control member 607, a light absorbing member 608, a light source 609, and a light source board 610.

In the liquid crystal display apparatus 600 in the sixth embodiment, a diffusion distance from a light emitting surface 630 of the light source device to the liquid crystal panel 601 is set large such that red, green, blue lights emitted from the light source device sufficiently diffuse and reaches the liquid crystal panel 601. In the light source device in the sixth embodiment, the light absorbing member 608 is disposed on a front surface side (a side where the liquid crystal panel 601 is set) of the outer peripheral portion of the wavelength conversion member 606. Consequently, red and green lights generated in the outer peripheral portion of the wavelength conversion member 606 are suppressed from being made incident on the display region side of the liquid crystal panel 601. That is, a beam control member 607 can be said to be a suppressing member that suppresses red and green lights converted in the end portion of the wavelength conversion member 606 from being emitted to the outside of the light source device.

In this embodiment, the light source holding member 603, the reflecting member 604, the diffusing member 605, the wavelength conversion member 606, the beam control member 607, the light source 609, and the light source board 610 are the same as the components having the same names in the first to fourth embodiments. Therefore, detailed explanation thereof is omitted.

The light absorbing member 608 is a suppressing member that suppresses the red and green lights generated in the outer peripheral portion of the wavelength conversion member 606 from being output to the outside of the light source device. The light absorbing member 608 is a member capable of absorbing at least incident red and green light.

The light absorbing member 608 is provided in a front surface side of a region where the wavelength conversion member 606 is supported by the light source holding member 603. For example, it is assumed that the light absorbing member 608 is located in the outer peripheral portion, where the wavelength conversion member 606 is supported by the light source holding member 603, and provided on a front surface side of the beam control member 607. Note that the light absorbing member 608 may be provided between the wavelength conversion member 606 and the beam control member 607. The light absorbing member 608 may be provided instead of the beam control member 607 corresponding to the region where the wavelength conversion member 606 is supported by the light source holding member 603.

Note that it is assumed that the region where the wavelength conversion member 606 is supported by the light source holding member 603 is a region corresponding to an outer side than a display region of the liquid crystal panel 601 opposite the region.

A solid line 622 in FIG. 8 indicates a part of blue light (primary light) emitted from the light source 609. A part of the blue light emitted from the light source 609 sometimes passes through the diffusing member 605 and is reflected on the interface between the diffusing member 605 and the wavelength conversion member 606 and the interface between the diffusing member 605 and the reflecting member 604. In this case, a part of the blue light emitted from the light source 609 is made incident on the outer peripheral portion where the wavelength conversion member 606 is supported by the light source holding member 603.

A part of the blue light made incident on the outer peripheral portion, where the wavelength conversion member 606 is supported by the light source holding member 603, is converted into red or green light (secondary light) on the inside of the wavelength conversion member 606 and isotropically emitted. On the other hand, the unconverted blue light is transmitted in a direction in which the blue light is made incident on the wavelength conversion member 606. A part of the converted red and green lights is emitted to the inner side from the outer peripheral portion of the wavelength conversion member 606. A dotted line 623 in FIG. 8 indicates a part of red and green lights emitted from the outer peripheral portion of the wavelength conversion member 606 to the inner side.

A part of the red and green lights emitted from the outer peripheral portion of the wavelength conversion member 606 is blocked by being suppressed by the light absorbing member 608 from being absorbed or reflected. Therefore, it is possible to suppress a part of the red and green lights generated in the outer peripheral portion of the wavelength conversion member 606 from being made incident on the display region side of the liquid crystal panel 601.

Other Embodiments

Note that the first to sixth embodiments are only examples. Configurations obtained by transforming or changing the configurations in the first to sixth configurations within the scope of the gist of the present invention are also included in the present invention. Configurations obtained by combining the configurations in the first to fourth and sixth aspects as appropriate are also included in the present invention.

That is, in the light source device including the wavelength conversion member that converts incident primary light into secondary light and outputs the secondary light, a configuration in which the light absorbing member is provided on the front surface side or the rear surface side (the side where the light source 609 is set) of the outer peripheral portion, where the wavelength conversion member is supported, is included in the present invention. Consequently, it is possible to suppress the secondary light emitted from the outer peripheral portion of the wavelength conversion member from being emitted from the light source device. It is possible to suppress luminance irregularity and color unevenness from occurring in the outer peripheral of the light emitting surface of the light source device.

Note that the quantum dot sheet of the wavelength conversion members 106, 206, 306, 506, and 606 in the first to sixth embodiments may be a multilayer structure including a wavelength conversion layer including quantum dots and a transparent protection layer that seals the periphery of the wavelength conversion layer in order to protect the wavelength conversion layer from the air (oxygen) and water. A wavelength conversion member formed by a multilayer structure of a diffusing member (layer), a wavelength conversion layer, and a beam control member (layer) may be used such that the diffusing member and the beam control member exhibit the function of the transparent protection layer.

The wavelength conversion member is not limited to the quantum dot sheet that converts, when blue light is made incident, a part of the blue light into red light or green light. For example, the wavelength conversion member may be a wavelength conversion member that converts, when ultraviolet light is made incident, a part of the ultraviolet light into red light, green light, or blue light and outputs the light. The wavelength conversion member may be a wavelength conversion member that converts, when blue light is made incident, a part of the blue light into yellow light and outputs the yellow light.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-001178, filed on Jan. 6, 2016, which is hereby incorporated by reference herein in its entirety.

What is claimed is:

1. A light source device comprising:
a light source configured to emit light of a first color;
a planar conversion member configured to transmit a part of the light of the first color and configured to convert another part of the light of the first color into light of a second color;
a supporting member configured to support at least a part of an outer peripheral portion of the conversion member;
a suppressing member configured to suppress the light of the second color, from at least the part of the outer peripheral portion of the conversion member that is supported by the supporting member, from being emitted to outside of the light source device; and
a reflecting member configured to reflect the light of the first color and the light of the second color toward a side of the conversion member, wherein
the suppressing member is a member having reflectance lower than reflectance of the reflecting member with respect to at least the light of the first color.

2. The light source device according to claim 1, wherein the suppressing member is provided between the supporting member and the outer peripheral portion of the conversion member.

3. The light source device according to claim 2, wherein the suppressing member is a member that absorbs at least the light of the first color.

4. The light source device according to claim 1, wherein the suppressing member is provided at a position further away from the light source than the conversion member.

5. The light source device according to claim 4, wherein the suppressing member is a member that absorbs at least the light of the second color.

6. The light source device according to claim 1, wherein the suppressing member is provided at a position corresponding to at least the part of the outer peripheral portion of the conversion member supported by the supporting member.

7. The light source device according to claim 6, wherein
the conversion member includes a convex portion in the part of the outer peripheral portion, and
the supporting member supports the convex portion.

8. The light source device according to claim 6, further comprising a fixing member configured to fix the conversion member and the suppressing member to the supporting member.

9. The light source device according to claim 6, wherein
the suppressing member includes a first suppressing member provided at a first end portion of the conversion member and a second suppressing member provided at a second end portion of the conversion member, and
in a case where a distance between the first end portion and the light source is larger than a distance between the second end portion and the light source, a width of the second suppressing member in a direction which is parallel to the conversion member and which is away from the light source is shorter than a width of the first suppressing member in the direction which is parallel to the conversion member and is away from the light source.

10. The light source device according to claim 1, wherein the conversion member includes a fluorescent body.

11. The light source device according to claim 1, wherein the conversion member includes quantum dots.

12. The light source device according to claim 1, wherein the light of the first color has a wavelength of a spectrum peak that is shorter than that of the light of the second color.

13. The light source device according to claim 1, wherein
the conversion member further converts another part of the incident light of the first color into light of a third color different from the first color and the second color,
the light of the first color is blue light,
the light of the second color is green light, and
the light of the third color is red light.

14. The light source device according to claim 1, wherein
the conversion member further converts another part of the incident light of the first color into light of a third color different from the first color and the second color and converts another part of the incident light of the first color into light of a fourth color different from the first color, the second color, and the third color,
the light of the first color is ultraviolet light,
the light of the second color is blue light,
the light of the third color is green light, and
the light of the fourth color is red light.

15. The light source device according to claim 13, wherein
a spectrum of the blue light has a peak in a wavelength range of 440 nm or more and 480 nm or less,
a spectrum of the red light has a peak in a wavelength range of 580 nm or more and 700 nm or less, and
a spectrum of the green light has a peak in a wavelength range of 500 nm or more and 550 nm or less.

16. The light source device according to claim 1, wherein the conversion member is a sheet member.

17. The light source device according to claim 1, wherein the conversion member includes a glass tube structure.

18. The light source device according to claim 1, wherein the suppressing member is a member that absorbs incident light.

19. The light source device according to claim 1, wherein
the supporting member is configured as a housing that houses the light source and includes an opening on a front surface of the housing,
the supporting member supports the conversion member to enable the conversion member to cover the opening of the housing, and
the light source is provided on a surface of the housing opposite the conversion member.

20. The light source device according to claim 1, further comprising a light guide plate configured to guide the light of the first color emitted from the light source to the conversion member, wherein
the supporting member configures a housing that houses the light source and the light guide plate and includes an opening on a front surface of the housing,
the supporting member supports the conversion member to enable the conversion member to cover the opening of the housing,
the light source is provided on at least one surface of side surfaces of the housing, and
the suppressing member is provided on a surface of the housing opposite the conversion member on a side of a side surface opposite the side surface of the housing on which the light source is provided.

* * * * *